(12) United States Patent
Livne et al.

(10) Patent No.: US 9,241,019 B2
(45) Date of Patent: Jan. 19, 2016

(54) SYSTEM AND METHOD OF EXTENDING IMS SCIM / SERVICE BROKER TO ENABLE APPLICATION SERVERS USING MSCML TO EXECUTE ON GSM CAMEL NETWORKS

(75) Inventors: Shlomo Livne, Ra'anana (IL); Dima Polsky, Jerusalem (IL); Vladimir Furman, Giv'at Ada (IL); Renana Seidman, Ra'anana (IL); Tali Ben-Meir, Ramat Gan (IL); Nadav Kadosh, Giv'atayim (IL); Tzach Livyatan, Tel Aviv (IL)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 189 days.

(21) Appl. No.: 13/610,643

(22) Filed: Sep. 11, 2012

(65) Prior Publication Data
US 2014/0074908 A1    Mar. 13, 2014

(51) Int. Cl.
*G06F 15/16* (2006.01)
*H04L 29/06* (2006.01)

(52) U.S. Cl.
CPC .......... *H04L 65/4046* (2013.01); *H04L 65/103* (2013.01); *H04L 65/1006* (2013.01); *H04L 65/1016* (2013.01); *H04L 65/1069* (2013.01); *H04L 65/608* (2013.01)

(58) Field of Classification Search
None
See application file for complete search history.

(56) References Cited

U.S. PATENT DOCUMENTS

| | | | | |
|---|---|---|---|---|
| 8,554,931 B1 * | 10/2013 | Vossoughian | ................. | 709/229 |
| 2007/0206735 A1 * | 9/2007 | Silver et al. | ................. | 379/88.19 |
| 2008/0235380 A1 * | 9/2008 | Maes | ............................ | 709/227 |
| 2008/0260119 A1 * | 10/2008 | Marathe et al. | ............ | 379/93.01 |
| 2009/0187919 A1 * | 7/2009 | Maes | ............................ | 719/313 |
| 2009/0219843 A1 * | 9/2009 | Chin et al. | ..................... | 370/310 |
| 2011/0212719 A1 * | 9/2011 | Janosi et al. | ................ | 455/422.1 |
| 2012/0173711 A1 * | 7/2012 | Bollapalli et al. | ............ | 709/224 |

FOREIGN PATENT DOCUMENTS

CN    WO2012055317 A1 *    5/2012    ............. H04L 29/06

* cited by examiner

*Primary Examiner* — Chris Parry
*Assistant Examiner* — Stephen Houlihan
(74) *Attorney, Agent, or Firm* — Tucker Ellis LLP

(57) ABSTRACT

In accordance with various embodiments, systems and methods that provide unified user interaction across different network interfaces are provided. A system can include a service control interaction manager (SCIM) which is operable to manage communication between one or more call parties and one or more applications. In a global system for mobile communications (GSM) network, when the one or more IP multimedia subsystem (IMS) applications connect a call party to a media resource, the SCIM is configured to connect the call party to a mobile switching center (MSC) internal resource function, receive a message from the one or more IMS applications which indicates an announcement to play to the call party and/or information to be collected from the call party, mediate the message into native customized applications for mobile networks enhanced logic (CAMEL) operations for the GSM network, and play the announcement and/or collect information indicated in the message.

20 Claims, 7 Drawing Sheets

SYSTEM AND METHOD OF EXTENDING IMS SCIM / SERVICE BROKER TO ENABLE APPLICATION SERVERS USING MSCML TO EXECUTE ON GSM CAMEL NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to telecommunications networks and in particular to a system and method of extending a service broker to enable application servers to execute on additional telecommunications networks.

BACKGROUND

SCIM/Service Broker enable operators to add multiple applications to serve a single session. IP multimedia subsystem (IMS) Application Servers use Media Server Control Markup Language (MSCML) to play announcements over media resource functions (MRF) to subscribers. However, customized applications for mobile networks enhanced logic (CAMEL) (CAP2, CAP3, CAP4) provides a set of dedicated operations for user interaction (playing announcements, collecting digits, etc).

A common method to enable IMS applications utilizing MSCML to play announcements over a global system for mobile network (GSM) is to anchor calls, that is, to transfer the call from the IN domain to the IMS domain and then connect to the MRF. This method is not optimal as it requires additional resources, and, in some cases, requires hauling the calls from one location to the MRF location which incurs additional costs for operators.

FIGS. 1A and 1B show a sequence diagram of an example SCIM with anchoring. As shown in FIGS. 1A and 1B, APP1 100 is configured to play an announcement at the beginning of a call to the caller A 102. In this example, A 102 is connected via a GSM network and needs to be connected to a media resource function (MRF 104) in order to receive the announcement. The call is initiated at 106 with a CAMEL InitialDP message to SCIM 108. INVITE messages are exchanged 110 with APP1 100, and APP1 indicates that it needs to connect A 102 to a resource function (to play an announcement). A 102 is then connected from the mobile switching center (MSC) to a media gateway (MG) and a media gateway control (MGC 112) which convert from TDM/ISUP to RTP/SIP (IMS). At 114, an INVITE message is sent from MGC 112 to SCIM 108 which includes the correlation information from SCIM 108. SCIM sends INFO (116) to APP1 marking that a voice path has been established toward the MRF, APP1 100 sends an INFO message 118 to the SCIM 108 identifying which message should be played using MSCML. At 120, the message is played to caller A and any needed information (e.g., digits) is collected. At 122, a CAMEL disconnect forward connection message (DFC) is sent to disconnect A from the resource function and at 124 the connections to the MG and MGC 112 and MRF 104 are closed. As shown above, this method of anchoring CAMEL/TDP into IMS is inefficient, and requires substantial processing.

Additionally, some SCIM/Service Broker platforms provide IMS applications, a standard API such as JSR309 "Media Server Control API" to access IMS MRF (via MSCML) and for non IMS applications, a different API to access the CAMEL operations (this overcomes the need to Anchor calls); however, in these cases, there is a need to develop an application twice—once for IMS (SIP and MSCML) and once for CAMEL, which incurs additional costs at development time, as well as additional maintenance costs.

SUMMARY

In accordance with various embodiments, systems and methods that provide unified user interaction across different network interfaces are provided. A system to extend an IMS SCIM to enable application servers using MSCML for user interaction to execute on CAMEL (GSM) networks, can include at least one application server, executing on one or more microprocessors, including one or more IMS applications. The system can further include a SCIM which is operable to manage communication between one or more call parties and one or more applications. In a GSM network, when the one or more IMS applications connect a call party to a resource function, the SCIM is configured to connect the call party to a MSC internal media resource function, receive a message from the one or more IMS applications which indicates an announcement to play to the call party or/and collect information from the call party, mediate the message into native CAMEL operations of the GSM network, and play the announcement or/and collect the information indicated in the message.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Figure 1A:
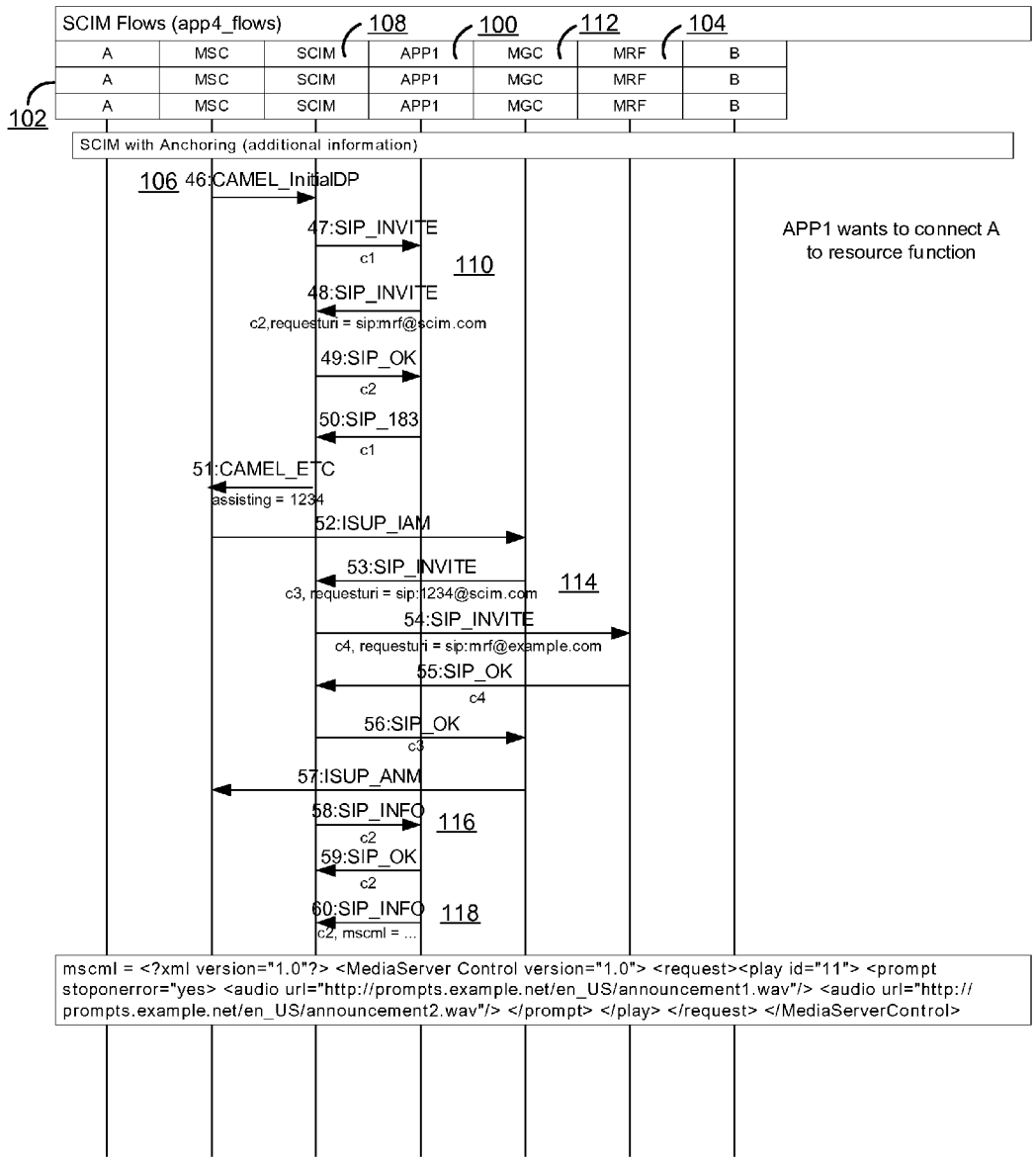
FIGS. 1A and 1B show a sequence diagram of an example SCIM with anchoring.
Figure 1B:
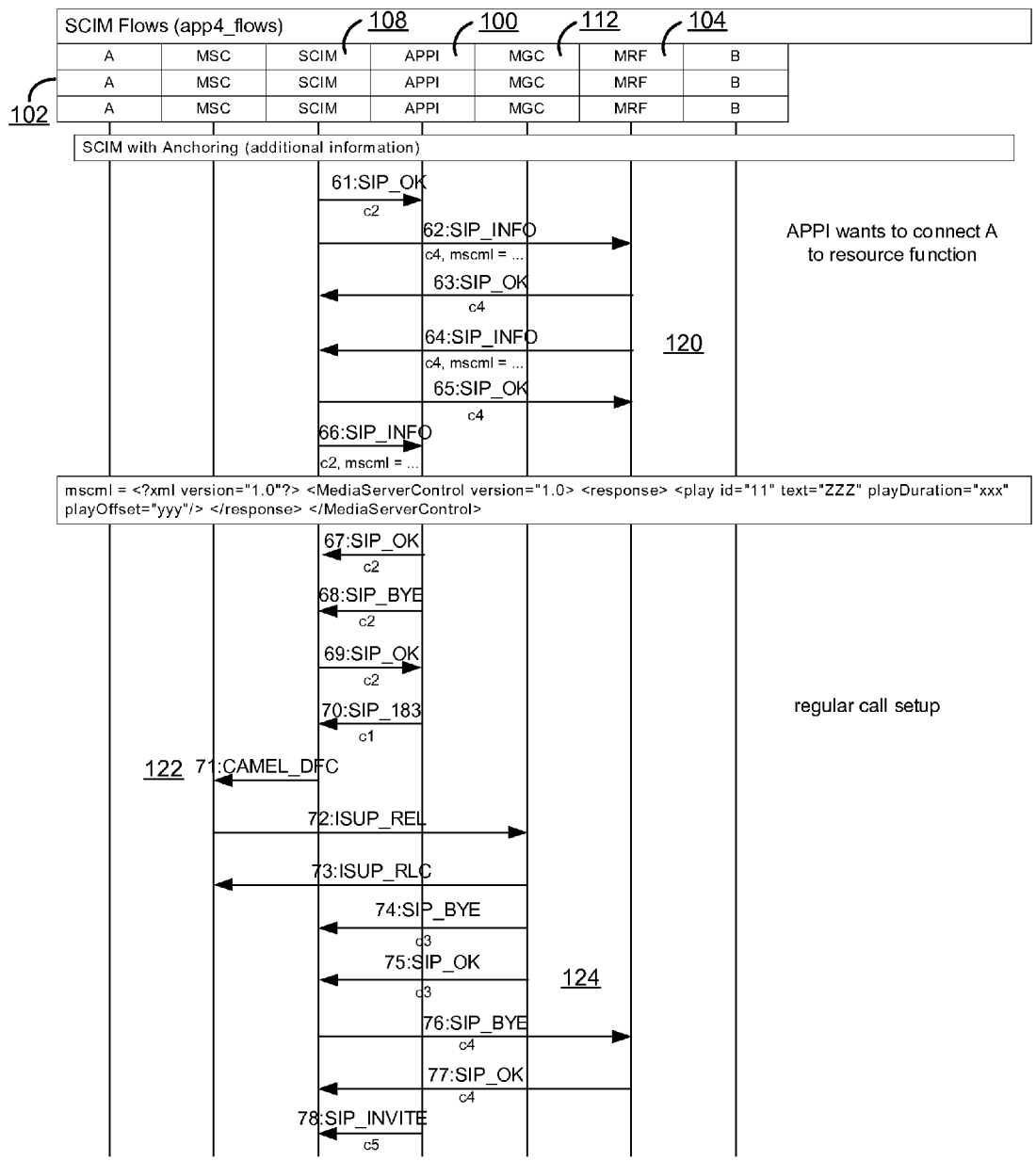
Figure 2:
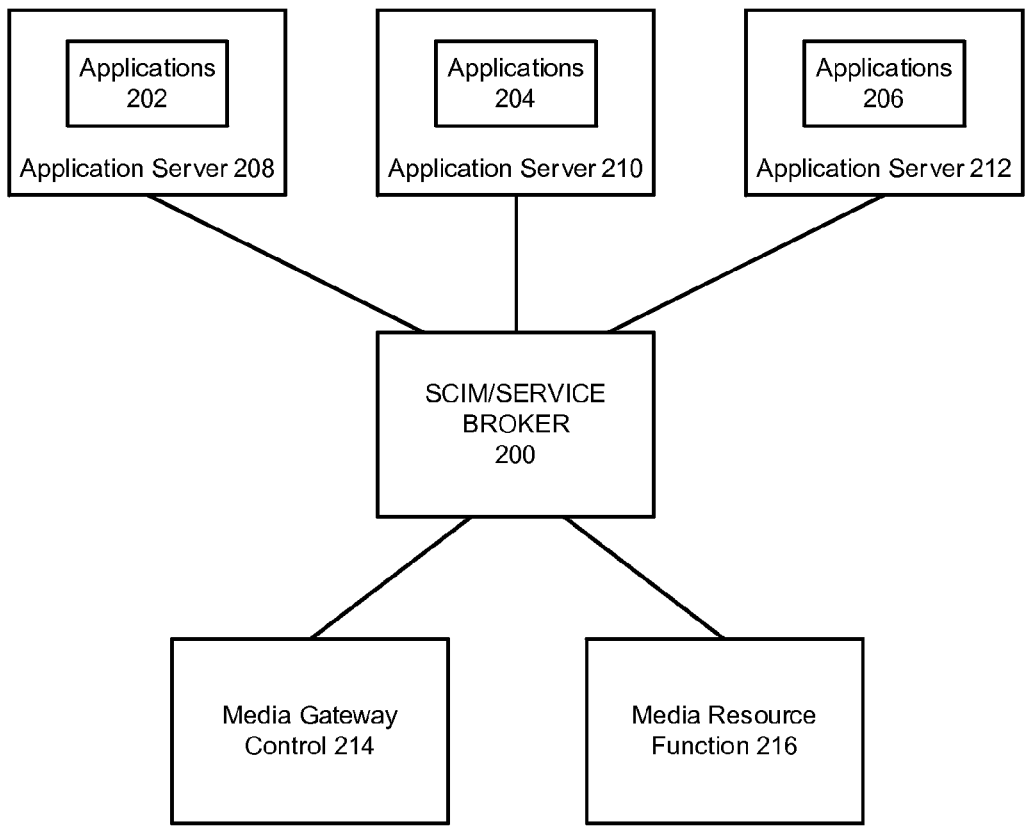
FIG. 2 shows a Service Control Interaction Management (SCIM)/Service Broker.

FIG. 2 shows a Service Control Interaction Management (SCIM)/Service Broker. The SCIM 200 can orchestrate, or chain together, multiple applications 202-206 across different application servers 208-212. Each of the plurality of application servers can include a plurality of applications. SCIM orchestration is done according to the signaling from the network. The SCIM 200 can connect to a media gateway controller (MGC) 214 that with a media gateway (MG) can convert between TDM/ISUP and RTP/SIP (IMS). Additionally, SCIM 200 can connect call parties to a media resource function (MRF) 216 to enable applications 202-206 to play announcements and collect information from the call parties.

Figure 3A:
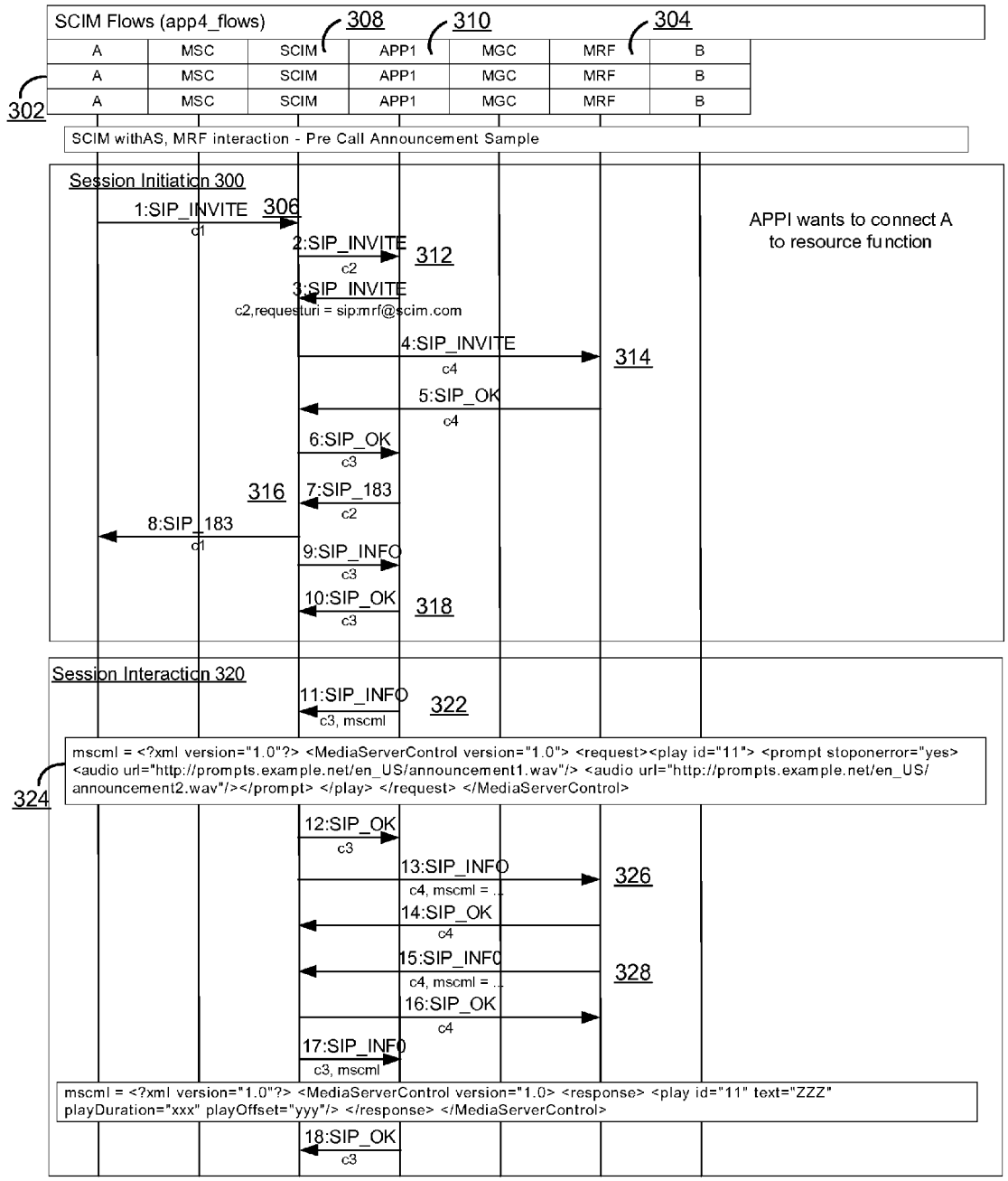
FIGS. 3A and 3B show a sequence diagram of playing an announcement in an IMS network, in accordance with an embodiment of the invention.
Figure 3B:
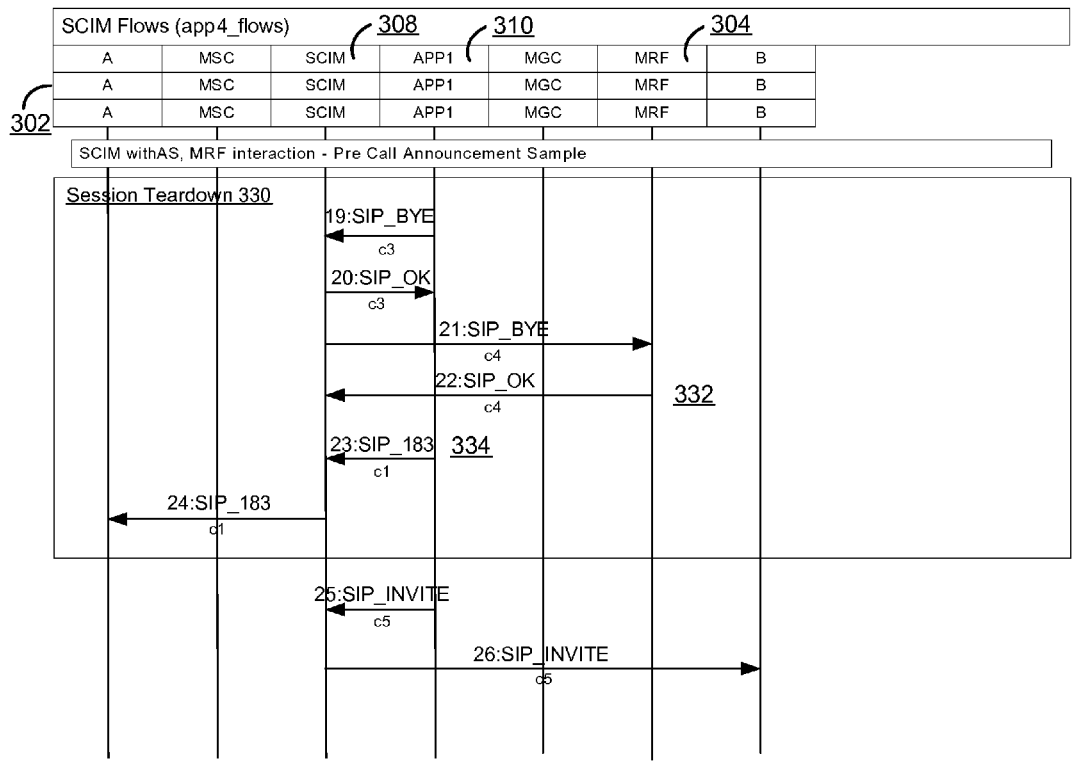

FIGS. 3A and 3B show a sequence diagram of playing an announcement in an IMS network. As shown in FIGS. 3A and 3B, an IMS application server plays a pre-call announcement using MSCML. Session Initiation 300 includes the steps of connecting the caller A 302 to MRF 304. At 306, an INVITE message is sent from A 302 to SCIM 308. The SCIM connects to APP1 310. APP1 310 sends an INVITE message 312 indicating that it wants to connect A 302 to a media resource (MRF 304). The SCIM sends an INVITE (314) to the MRF 304 and send to caller A (302) the SDP information of the MRF at 316. APP1 310 is then notified 318 that the connection to caller A 302 is open and it can start to play announcements. Session Interaction 320 includes the steps of playing the announcement to A 302 and receiving any response. At 322, an INFO message is sent from APP1 310 to SCIM 308 which includes MSCML data 324 indicating which announcement should be played. The instructions are passed at 326 to the MRF which plays the announcement and if needed collects information, and then a response is returned 328 along with any information that was collected from A (e.g., digits). During the session teardown 330, the connection to the MRF 304 is cleared 332 and the voice path to caller A 302 is disconnected 334.

Figure 4:
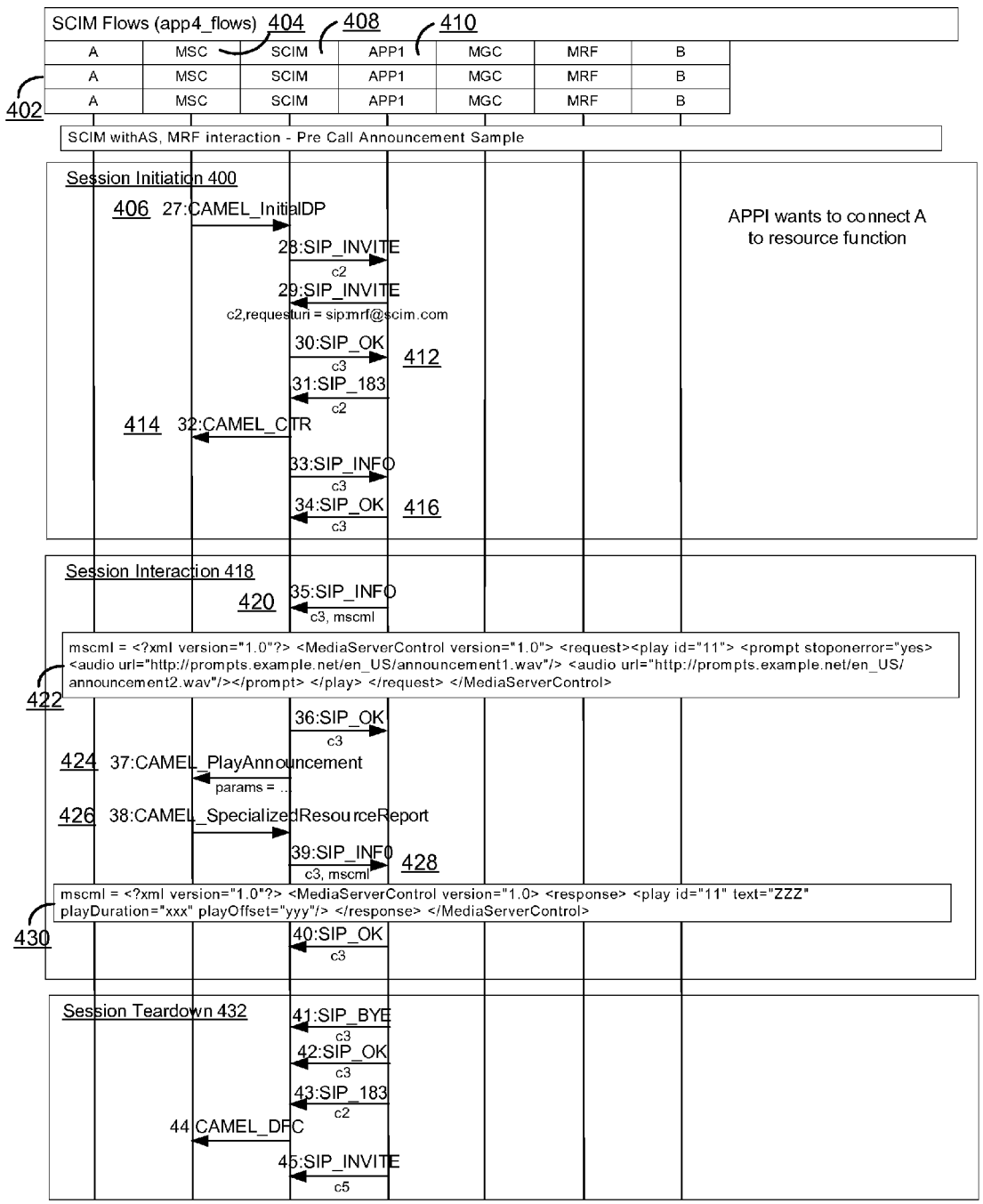
FIG. 4 shows a sequence diagram of playing an announcement in a CAMEL (GSM) network, in accordance with an embodiment of the invention.

FIG. 4 shows a sequence diagram of playing an announcement in a CAMEL (GSM) network, in accordance with an embodiment of the invention. As shown in FIG. 4, Session Initiation 400 includes the steps of connecting caller A 402 to MSC internal media resource 404. At 406, an InitialDP message is sent to the SCIM 408. SCIM 408 sends an INVITE to APP1 410 which replies with an INVITE 412 indicating it wants to connect caller A 402 to a resource function. SCIM 408 then sends a CAMEL connect to resource (CTR) message 414 to connect A 402 to the MSC internal resource function (404). APP1 410 is then notified 416 that it can start to play announcements and collect information. Session Interaction 418 includes the steps of playing announcements and collecting information in response. A play request 420 including MSCML code 422, identifying the announcement to be played, is sent from APP1 410 and is mediated to a PlayAnnouncement 424 toward the MSC resource function 404. After the announcement has been played, a SpecializedResourceReport 426 is mediated into SIP INFO 428 and appropriate MSCML code 430 is sent back toward APP1 410. In the Session Teardown 432, the connection of caller A 402 to the media resource is cleared. In the embodiment shown in FIG. 4, the IMS Application Server interacts with the SCIM/Service Broker in the same manner as that in FIG. 3. The SCIM/Service Broker mediates the procedures (flow, messages, and parameters) onto the GSM IN Camel protocol.

In accordance with an embodiment of the invention, MSCML code can be mapped (i.e., mediated) into CAMEL (CAP2, CAP3, CAP4) operations. This removes the need to anchor calls and allows applications to be written once (in IMS).

During Session Initiation, the SCIM/Service Broker can detect that a connection to an MRF is requested (e.g., a SIP INVITE with MRF address) and can issue a CAMEL_ConnecttoResource operation on the leg that the MRF session description protocol (SDP) is passed (183/REINVITE). The SDPs indicate to which stream the call party is connected. Since different announcements can be played at the same time to different parties, the SDPs can be tracked such that the system can determine for each party to which stream it is connected and which announcement should be played to which party. During Session Teardown, the SCIM/Service Broker can detect that a disconnection from an MRF is requested (SIP BYE on MRF LEG) and can issue a CAMEL_DisconnectForwardConnection operation on the leg connected to the media resource once a new SDP/SDP=0 is passed (183/REINVITE).

During Session Interaction, the SCIM/Service Broker can map SIP INFO messages which include MSCML code onto GSM CAMEL messages. The mapping is shown below in Table 1.

TABLE 1

| MSCML | CAMEL |
|---|---|
| <request><play>...</play></request> | PlayAnnouncement |
| <request><playcollect>...</playcollect></request> | PromptAndCollect |
| <request><stop>...</stop></request> | Cancel |

Table 2 shows SCIM/Service Broker mapping of GSM CAMEL response onto INFO which includes MSCML.

TABLE 2

| CAMEL | MSCML |
|---|---|
| SpecializedResourceReport ReceivedInformation | <response><play>...</play></response> <response><playcollect>...</playcollect></response> |
| Cancelled Error response for PlayAnnouncement/Prompt AndCollect | <response><XXX>reason= stopped<XXX></response> |

Figure 5:
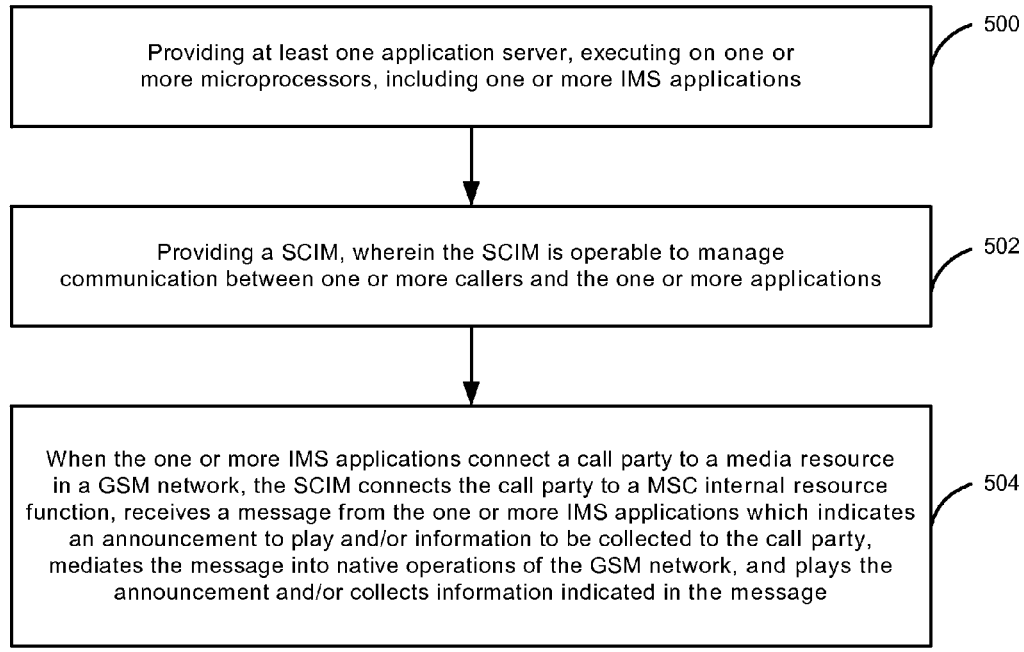
FIG. 5 shows a method of extending IMS SCIM/Service Broker to enable application servers using MSCML to interact with the user to execute on CAMEL (GSM) networks, in accordance with an embodiment of the invention.

FIG. 5 shows a method of extending IMS SCIM/Service Broker to enable application servers to execute on CAMEL (GSM) networks, in accordance with an embodiment of the invention. At step 500, at least one application server, executing on one or more microprocessors, including one or more IMS applications, is provided. At step 502, a SCIM is provided which is operable to manage communication between one or more call parties and the one or more applications. At step 504, when the one or more IMS applications connect a call party to a media resource, in a GSM network, the SCIM connects the call party to an MSC internal resource function, receives a message from the one or more IMS applications which indicates an announcement to play and/or information to be collected to the call party, mediates the message into native CAMEL operations of the GSM network, and plays the announcement and/or collects information indicated in the message.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system to extend a service control interaction manager (SCIM) to enable application servers using media server control markup language (MSCML) to execute on a global system for mobile communications (GSM) network, comprising:
   an application on an application server in an IP multimedia subsystem (IMS) network, executing on one or more microprocessors, wherein the application is configured to process MSCML messages; and
   a SCIM, in communication with the IMS network and a GSM network, that operates to play an announcement to, and collect information from, a call party connected to the GSM network, by performing the steps comprising:
     establishing a session between the call party and an internal media resource in the GSM network,
     receiving, from the application in the IMS network, an MSCML message indicating content of the announcement to be played to and the information to be collected from the call party, wherein the information to be collected is to be generated by input of the call party,
     mapping the message into one or more CAMEL messages representing native CAMEL operations on the internal media resource of the GSM network, and
     using the native CAMEL operations to play the announcement and collect the information from the call party, as indicated by the message received in the MSCML format from the application.

2. The system of claim 1, wherein the SCIM is further configured to receive the information to be collected from the call party;
   map the collected information into a Session Initiation Protocol (SIP) message; and
   send the SIP message to the application.

3. The system of claim 2, wherein mediating the collected information into a SIP message comprises translating the user input from one or more native operations of the GSM network into MSCML code.

4. The system of claim 1, wherein the SCIM is configured to track session description protocols (SDPs) to determine which stream the call party is connected to receive an appropriate announcement.

5. The system of claim 1, wherein the SCIM is further configured to play a plurality of messages to and collect information from a plurality of call parties.

6. The system of claim 1, wherein the mapping of the message into one or more CAMEL messages removes the need to anchor calls from the call party and enable the application to be used for both the IMS network and the GSM network.

7. The system of claim 1, wherein the call party is a user.

8. A method to extend a service control interaction manager (SCIM) to enable application servers using media server control markup language (MSCML) to execute on global system for mobile communications (GSM) networks, comprising:
   providing an application on an application server in an IP multimedia subsystem (IMS) network, executing on one or more microprocessors, wherein the application is configured to process MSCML messages; and
   providing a SCIM, in communication with the IMS network and a GSM network, that operates to play an announcement to, and collect information from, a call party connected to the GSM network, by performing the steps comprising:
     establishing a session between the call party and an internal media resource in the GSM network,
     receiving, from the application in the IMS network, an MSCML message indicating content of the announcement to be played to and the information to be collected from the call party, wherein the information to be collected is to be generated by input of the call party,
     mapping the message into one or more CAMEL messages representing native CAMEL operations on the internal media resource of the GSM network, and
     using the native CAMEL operations to play the announcement and collect the information from the call party, as indicated by the message received in the MSCML format from the application.

9. The method of claim 8, wherein the SCIM is further configured to
   receive the information to be collected from the call party;
   map the collected information into a Session Initiation Protocol (SIP) message; and
   send the SIP message to the application.

10. The method of claim 9, wherein mediating the collected information into a SIP message comprises translating the user input from one or more native operations of the GSM network into MSCML code.

11. The method of claim 8, further comprising:
    tracking, by the SCIM, session description protocols (SDPs) to determine which stream the call party is connected to receive an appropriate announcement.

12. The method of claim 8 further comprising:
playing a plurality of messages to, and collect information, by the SCIM, from a plurality of call parties.

13. The method of claim 8, wherein the mapping of the message into one or more CAMEL messages removes the need to anchor calls from the call party and enable the one or more applications to be used for both the IMS network and the GSM network.

14. The method of claim 8, wherein the call party is a user.

15. A non-transitory computer readable storage medium including instructions stored thereon which, when executed by a computer, cause the computer to perform the steps comprising:
providing an application on an application server in an IP multimedia subsystem (IMS) network, executing on one or more microprocessors, wherein the application is configured to process MSCML messages; and
providing a SCIM, in communication with the IMS network and a GSM network, that operates to play an announcement to, and collect information from, a call party connected to the GSM network, by performing the steps comprising:
establishing a session between the call party and an internal media resource in the GSM network,
receiving, from the application in the IMS network, an MSCML message indicating content of the announcement to be played to and the information to be collected from the call party, wherein the information to be collected is to be generated by input of the call party,
mapping the message into one or more CAMEL messages representing native CAMEL operations on the internal media resource of the GSM network, and
using the native CAMEL operations to play the announcement and collect the information from the call party, as indicated by the message received in the MSCML format from the application.

16. The non-transitory computer readable storage medium of claim 15, wherein the SCIM is further configured to
receive the information to be collected from the call party;
map the collected information into a Session Initiation Protocol (SIP) message; and
send the SIP message to the application.

17. The non-transitory computer readable storage medium of claim 15, wherein mediating the user input into a SIP message comprises translating the user input from one or more CAMEL operations into MSCML code.

18. The non-transitory computer readable storage medium of claim 15, further comprising:
tracking, by the SCIM, session description protocols (SDPs) to determine which stream the call party is connected to receive an appropriate announcement; and
playing a plurality of messages to and collect information from a plurality of call parties by the SCIM.

19. The non-transitory computer readable storage medium of claim 15, wherein the mapping of the message into one or more CAMEL messages removes the need to anchor calls from the call party and enable the one or more applications to be used for both the IMS network and the GSM network.

20. The non-transitory computer readable storage medium of claim 15, wherein the call party is a user.

* * * * *